INVENTOR
Terence F. Crang

Aug. 7, 1962 T. F. CRANG 3,048,191
ROTARY COCKS AND VALVES
Filed Sept. 12, 1960 2 Sheets-Sheet 2

INVENTOR
Terence F. Crang
BY
Kenyon, Palmer & Stewart
ATTORNEY

United States Patent Office 3,048,191
Patented Aug. 7, 1962

3,048,191
ROTARY COCKS AND VALVES
Terence F. Crang, Cowes, Isle of Wight, England, assignor to Kinematics Limited, London, England, a British company
Filed Sept. 12, 1960, Ser. No. 55,546
4 Claims. (Cl. 137—625.32)

The present invention relates to improvements in rotary cocks and valves (hereinafter referred to for convenience as "cocks") in which a plug is arranged in a bore formed in a body having aligned or substantially aligned inlet and outlet ports, so as to be rotatable between a "shut position" in which the inlet and outlet ports are sealed off from one another and an "open" position in which they inter-communicate through one or more ducts in the plug and in which the working clearances between the plug and the body are sealed by resilient sealing rings such as O rings.

It is an object of this invention to provide an improved cock of the character described in which, apart from two sealing rings which are required for sealing the two ends of the working clearance from the outside atmosphere, only one additional sealing ring is required to prevent leakage of fluid through said working clearance from the inlet port to the outlet port in the shut position.

For convenience, the two first-mentioned sealing rings will be referred to as "bland sealing rings" and the additional sealing ring as a "bore sealing ring."

In the improved cock according to this invention, the plug is formed firstly with two circumferential annular grooves located in planes substantially normal to the axis of rotation of the plug and on opposite sides respectively of the inlet and outlet ports each containing a gland sealing ring, secondly with an additional circumferential annular groove containing a bore sealing ring and located in a plane which is inclined to the said axis of rotation at an angle such that, in the "shut position" of the plug, those parts of the bore sealing ring which are most nearly adjacent the gland sealing rings are situated on the same sides of the inlet and outlet ports as their most nearly adjacent gland sealing rings, and thirdly with recesses in opposite sides thereof providing channels for connecting the inlet and outlet ports when the plug is in the "open position," said recesses being formed in opposite sides of the plug between the bore sealing ring on the one hand and those parts of the gland sealing rings which are most widely separated from the bore sealing ring on the other hand, and the walls of said recesses being spaced from the walls of the grooves containing said sealing rings.

The recesses are preferably of segmental or truncated segmental shape with walls joining the circumference of the plug along lines which are uniformly spaced from the side walls of the grooves containing the sealing rings.

In order that the portion of the plug formed with the groove containing the bore sealing ring should not unduly restrict the free flow of fluid between the inlet and outlet ports when the plug is in the open position, the portions of said ports which open into the bore in the cock body are chamfered laterally with respect to the axis of rotation of the plug, so that for example the contours of the junction lines between the ports and the bore at these portions are elliptical, or are diamond shaped with rounded corners at their laterally spaced ends.

A constructional embodiment of the invention will now be described by way of example with reference to the accompanying drawings.

Figure 1:
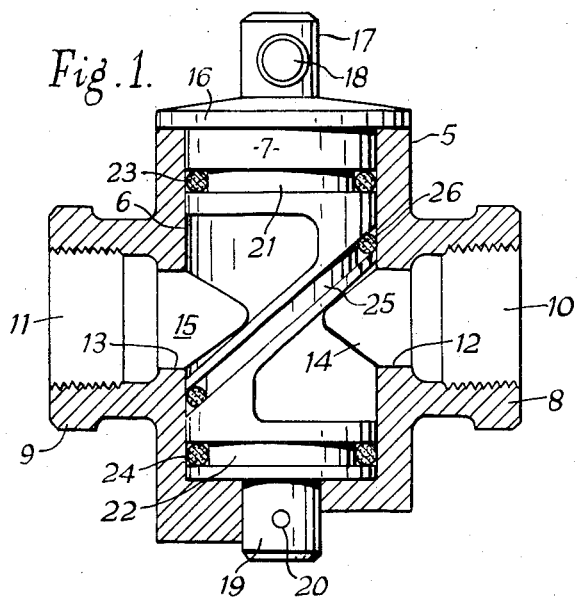
FIG. 1 is a vertical section of a cock in the shut position.

Referring to the drawings, the cock body, which is indicated generally by the reference 5, is a pressure die casting having a cylindrical bore 6 for accommodating the cock plug which is indicated generally by the reference 7, and aligned inlet and outlet connections 8, 9. These connections have enlarged screw-threaded pipe sockets 10, 11 at their outer ends, which sockets 10, 11 open into smaller diameter cylindrical ports 12, 13, the inner ends of which are enlarged at their intersection with the inner surface of the bore 6, by chamfers 14 (FIGS. 1 and 4) on each side in the case of the port 12 and similar chamfers 15 on each side (only one of which is visible in FIG. 1) in the case of the port 13.

The cock plug 7 is basically of cylindrical form to suit the bore 6 in the body 5. At its top end, it is formed with a flange 16 which serves primarily to prevent entry of dirt. Projecting upward from the middle of this flange 16 is a spigot 17 fitted with a handle 18. A further central spigot 19 projecting downward from the lower end of the cock plug 7 is fitted with a transverse pin 20 to retain the plug 7, and, by cooperation with stops on the bottom of the cock body 5, to limit the rotary travel of the plug 7 to 90°.

Close to the upper and lower ends of the cock plug 7 are formed annular grooves 21, 22 containing gland sealing O rings 23, 24. Between the grooves 21, 22 is machined a third groove 25 inclined to the axis of the cock plug 7 and containing a bore sealing O ring 26. The angle of inclination of the bore sealing ring is such that, when the cock plug 7 is in place in the cock body 5 and is in the "shut position" shown in FIG. 1, the bore sealing ring 26 seals off the inlet port 12 from the outlet port 13.

Figure 2:
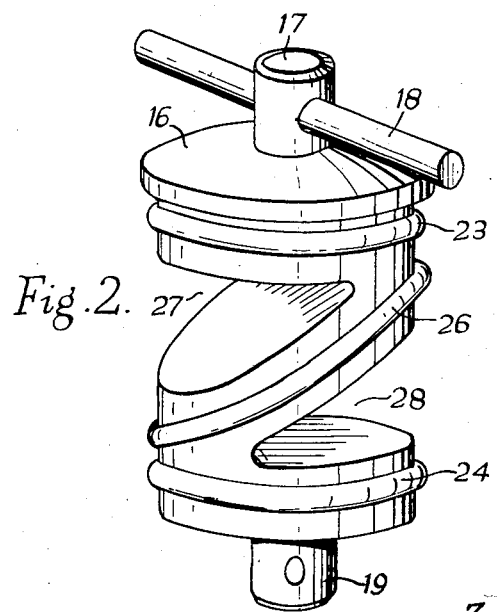
FIG. 2 is a perspective view of the rotatable plug of the cock shown in FIG. 1.

Referring more particularly to FIG. 2, it will be seen that two segmental recesses 27, 28 are cut out of the plug 7, one on each side of the bore sealing ring 26, leaving only sufficient metal on each side of the groove 25 (FIG. 1) and on the sides of the gland sealing rings 23, 24 which are nearer to the groove 25 to ensure adequate mechanical strength.

Figure 3:
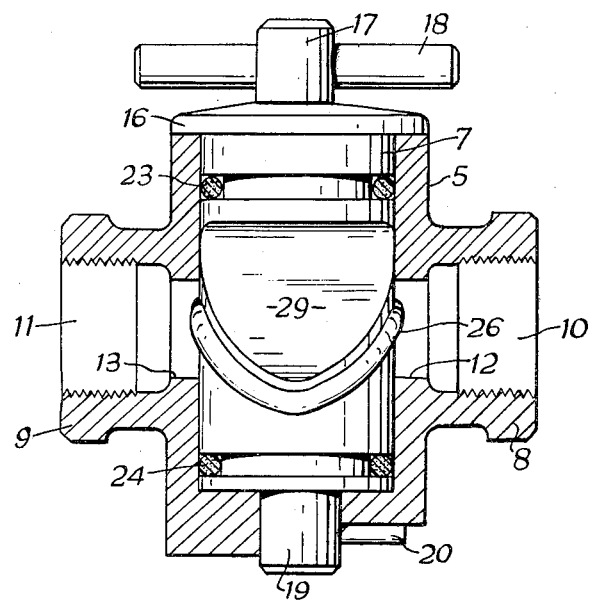
FIG. 3 is a vertical section of the same cock in the open position.

It will be seen that, when the plug 7 is turned through 90° from the "shut position" shown in FIG. 1 to the "open position" shown in FIG. 3, the inlet and outlet ports 12, 13 are put into communication through the segmental recesses 27, 28 on each side of the inclined portion 29 containing the bore sealing ring 26. It will also be appreciated from FIG. 4 that the inclined portion 29, in this position, extends diametrally across the cylindrical ports 12, 13 and that, if the flow areas of these ports had not been enlarged by the chamfers 14 and 15 the flow area between the said ports would have been reduced by an amount equal to the area of that part of the inclined portion 29 which is in register with the cylindrical ports 12, 13. The chamfers 14 and 15, however, enlarge the effective flow areas of the ports 12, 13 where they join the inner surface of the bore 6 at least sufficiently to offset any such reduction.

Figure 4:
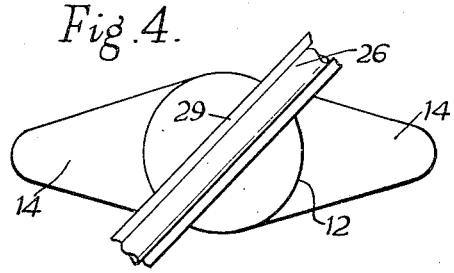
FIG. 4 is a fragmentary drawing on an enlarged scale showing how the inner ends of the inlet and outlet bores in the body of the cock are enlarged and also showing the relative position of part of the rotatable plug when the cock is open.

The outline shape of the chamfered inner ends of the ports 12, 13 may be as shown in FIG. 4 or generally similar thereto, e.g. it could be elliptical. In general, however, the minor axis of this outline shape should be equal in length to the diameters of the cylindrical ports 12, 13, while the major axis should be of such a size that the sum of the areas on each side of the inclined portion 29 of the cock plug 7 is at least equal to the area of each of the cylindrical ports 12, 13.

I claim:

1. A rotary cock or valve in which a plug is arranged in a bore formed in a body having aligned, or substantially aligned, inlet and outlet ports, so as to be rotatable between a shut position and an open position and in which the working clearances between the plug and the body are sealed by resilient sealing rings, characterised in that the plug is formed firstly with two circumferential annular grooves located in planes substantially normal to the axis of rotation of the plug and on opposite sides respectively of the inlet and outlet ports each containing a gland sealing ring, secondly with an additional circumferential annular groove containing a bore sealing ring and located in a plane which is inclined to the said axis of rotation at an angle such that, in the "shut position" of the plug, the part of the bore sealing ring which is most nearly adjacent a particular gland sealing ring being situated on the same side of the inlet and outlet ports as such particular gland sealing ring, and thirdly with recesses in opposite sides thereof providing channels for connecting the inlet and outlet ports when the plug is in the "open position," said recesses being formed in opposite sides of the plug between the bore sealing ring on the one hand and those parts of the gland sealing rings which are most widely separated from the bore sealing ring on the other hand, and the walls of said recesses being spaced from the walls of the grooves containing said sealing rings.

2. A cock or valve as claimed in claim 1, characterised in that the recesses in the opposite sides of the plug are of substantially segmental shape with walls joining the circumference of the plug along lines which are uniformly spaced from the side walls of the grooves containing the sealing rings.

3. A cock or valve as claimed in claim 2, characterised in that those portions of the inlet and outlet ports which open into the bore in the body of the cock or valve are chamfered laterally.

4. A cock or valve as claimed in claim 3, characterised in that the contours of the junction lines between the ports and the bore in the body of the cock or valve at those portions where said ports open into said bore are substantially elliptical.

References Cited in the file of this patent

UNITED STATES PATENTS

| | | |
|---|---|---|
| 2,631,002 | Mueller | Mar. 10, 1953 |
| 2,695,036 | Kronheim | Nov. 23, 1954 |
| 2,766,771 | Wenzel | Oct. 16, 1956 |

FOREIGN PATENTS

| | | |
|---|---|---|
| 287,969 | Switzerland | Apr. 16, 1953 |
| 494,708 | Italy | May 29, 1954 |
| 205,080 | Australia | Oct. 6, 1955 |